(12) United States Patent
Lin

(10) Patent No.: US 7,226,028 B2
(45) Date of Patent: Jun. 5, 2007

(54) DISPLAY SWIVEL

(75) Inventor: Chih-Chiang Lin, Taoyuan (TW)

(73) Assignee: Quanto Computer Inc., Tao Yuan Shein (TW)

( * ) Notice: Subject to any disclaimer, the term of this patent is extended or adjusted under 35 U.S.C. 154(b) by 89 days.

(21) Appl. No.: 11/153,466

(22) Filed: Jun. 16, 2005

(65) Prior Publication Data

US 2005/0279904 A1    Dec. 22, 2005

(30) Foreign Application Priority Data

Jun. 21, 2004  (TW) .............................. 93209789 U

(51) Int. Cl.
*E04G 3/00* (2006.01)
(52) U.S. Cl. ..................... 248/291.1; 248/921; 403/60; 403/116
(58) Field of Classification Search ..................... None
See application file for complete search history.

(56) References Cited

U.S. PATENT DOCUMENTS

| | | | | |
|---|---|---|---|---|
| 3,936,026 A | * | 2/1976 | Hampel et al. | 248/349.1 |
| 4,919,383 A | * | 4/1990 | Benjamin et al. | 248/349.1 |
| 5,335,142 A | * | 8/1994 | Anderson | 361/681 |
| 6,024,335 A | * | 2/2000 | Min | 248/371 |
| 7,048,242 B2 | * | 5/2006 | Oddsen, Jr. | 248/280.11 |
| 2004/0068185 A1 | * | 4/2004 | Marshall et al. | 600/437 |

* cited by examiner

*Primary Examiner*—Ramon O Ramirez
(74) *Attorney, Agent, or Firm*—Rabin & Berdo, PC

(57) ABSTRACT

A display swivel is described. The display swivel has a rotational portion, a pedestal, a fixed washer, a lubricating washer, and a fixing device. The rotational portion utilizes a rotational shaft to couple to a rotational ring of the pedestal. The fixed washer is fixed on the rotational shaft, and the lubricating washer is fixed on the rotational ring and is configured between the fixed washer and the rotational ring. The fixing device couples to the rotational shaft through central holes of the fixed washer and the lubricating washer.

18 Claims, 1 Drawing Sheet

DISPLAY SWIVEL

RELATED APPLICATIONS

The present application is based on, and claims priority from, Taiwan Application Serial Number 93209789, filed Jun. 21, 2004, the disclosure of which is hereby incorporated by reference herein in its entirety.

FIELD OF THE INVENTION

The present invention generally relates to a display swivel. More particular, the present invention relates to a flat panel display swivel.

BACKGROUND OF THE INVENTION

Conventional cathode ray tube (CRT) displays are inappropriate for use in multimedia applications because of their large volume. Therefore, many flat panel display techniques such as liquid crystal display (LCD), plasma display panel (PDP), and field emission display (FED) have been recently developed. These display techniques can manufacture a thin, light, short and small display, and thus these techniques are and will be the mainstream technology.

Flat panel displays possess advantages of high quality, small volume, and light weight, and are widely applied to various electronic products. Particularly in personal computers, notebook computers, and multimedia audio-video household appliances, flat panel displays gradually occupy a major part of the market. The flat panel display has to rotate horizontally to display the image for users at different positions.

Although a conventional display swivel normally provides a horizontal rotation function, the display may sometimes become loose on the display swivel due to looseness of fixing devices caused by frequent rotations. More seriously, the display may fall from the swivel so as to damage the display.

SUMMARY OF THE INVENTION

It is an object of the present invention to provide a display swivel with fixing washers that effectively and safely configures a fixing device of the display swivel thereon.

It is another object of the present invention to provide a display swivel with a fixed lubricating washer for rotating the display swivel smoothly.

It is further object of the present invention to provide a display swivel utilizing a rotational shaft inserted into a rotational ring and forming two sliding surfaces on both sides of the rotational ring to provide a smooth, safe rotation for the swivel.

To accomplish the above objectives, the present invention provides a display swivel suitable for application to a flat panel display for adjusting the display panel angle or to any other electronic device for adjusting working angle thereof The display swivel includes a rotational portion, a pedestal, a rotational shaft washer, a lubricating washer and a fixing device. The rotational portion further includes a rotational shaft protruding from the rotational portion to couple rotatably to a rotational ring of the pedestal. The rotational shaft washer is fixed on the rotational shaft and the lubricating washer is disposed between the rotational shaft washer and the rotational ring. The fixing device, e.g. a bolt, passes through central holes of the rotational shaft washer and the lubricating washer to couple to the rotational shaft.

The rotational portion further includes a rotational disc. The rotational disc and the pedestal construct a first sliding surface therebetween. The first sliding surface further has a lubricant thereon for reducing a rotation friction of the display swivel and can include a plurality of hollows to store the lubricant therein. A second sliding surface is constructed between the rotational shaft washer and the lubricating washer. In the same manner, the second sliding surface can include a plurality of hollows or holes to store the lubricant therein. The first sliding surface and the second sliding surface are respectively disposed on both sides of the rotational ring to reduce the friction for rotating the rotational portion.

The rotational ring further includes a lubricating washer fixing device inserted into one of the holes of the lubricating washer to fix the lubricating washer on the rotational ring. The rotational disc further includes an angle restrictor and the pedestal further includes an angle-restricting trench corresponding to the angle restrictor to limit a rotational angle of the rotational portion.

The rotational ring further includes two fixing planes to couple to two fixing corner of the lubricating washer so as to fix the lubricating washer on the rotational ring. The rotational shaft further utilizes a washer fixing device to couple to a washer fixing hole of the rotational shaft washer to fix the rotational shaft washer on the rotational shaft.

The display swivel according to the present invention utilizes the rotational shaft washer to prevent the fixing device of the display swivel from falling off, and the fixing device of the display swivel can be therefore firmly secured on the rotational shaft. The display swivel according to the present invention further utilizes the first sliding surface and the second sliding surface disposed on both sides of the rotational ring to reduce a friction for rotating the rotational portion so that the rotational portion can rotate smoother. The angle restrictor and the angle-restricting trench coupling together can further provide a suitable angle protection for the display swivel.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
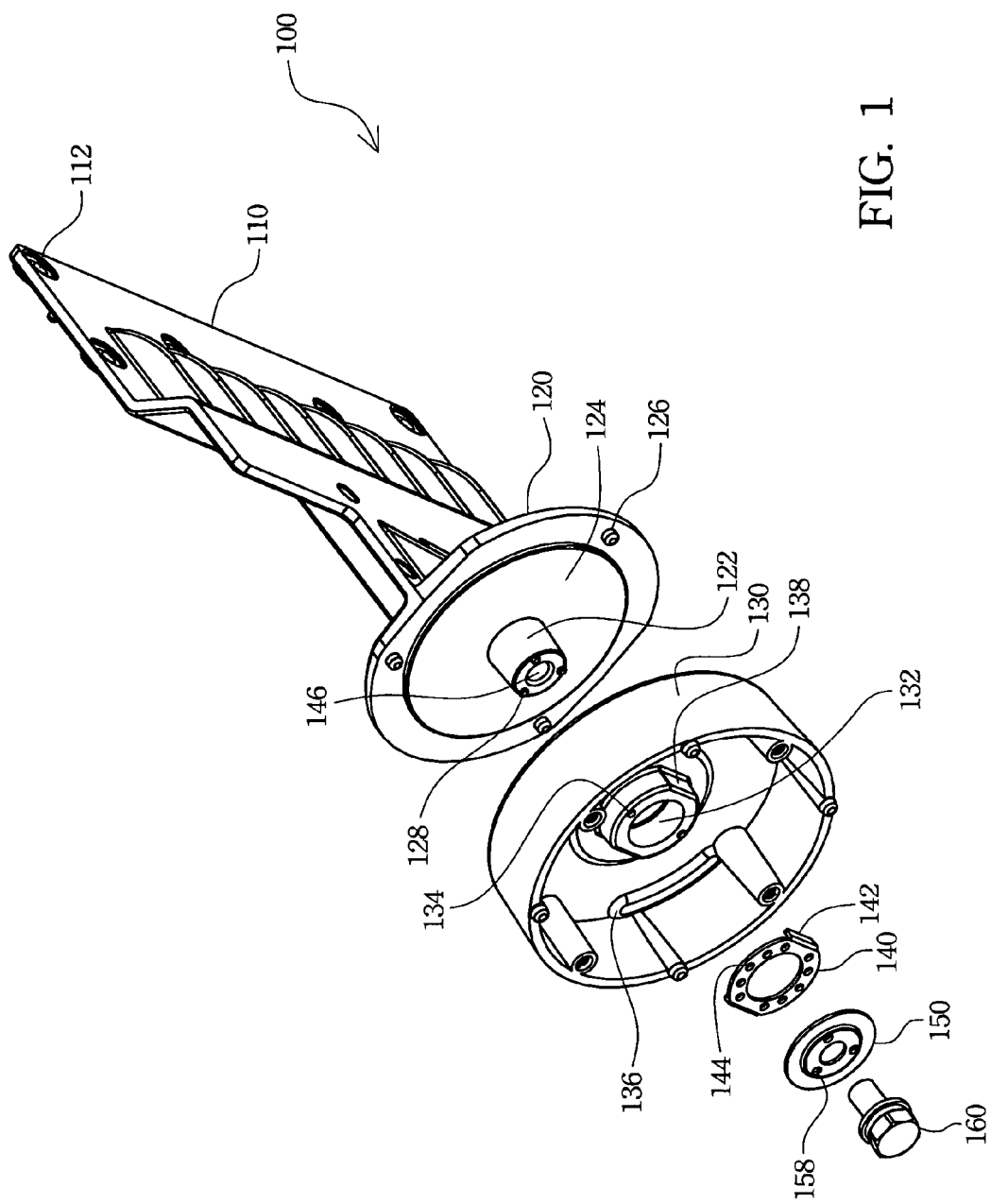
FIG. 1 is a preferred embodiment of a display swivel according to the present invention.

The following description is of the best presently contemplated mode of carrying out the present invention. This description is not to be taken in a limiting sense but is made merely for the purpose of describing the general principles of the invention. The scope of the invention should be determined by referencing the appended claims.

FIG. 1 is a preferred embodiment of a display swivel according to the present invention. Referring to FIG. 1, the display swivel 100 includes a display supporting plate 110, a rotational portion 120, and a pedestal 130. The display supporting plate 110 is fixed to the rotational portion 120 for rotating on the pedestal 130. A flat display panel is fixed on the display supporting plate 110 by way of display fixing hole 112 and corresponding fixing devices (not shown) to increase an effective fixing area between the flat display panel and the display swivel 100.

A rotational shaft 122 of the rotational portion 120 rotatably couples to a rotational ring 132 of the pedestal 130 so that the rotational portion 120 can smoothly rotate on the pedestal 130. The rotational shaft 122 is inserted into the rotational ring 132 so as to provide a stable and safe connection therebetween.

The rotational portion 120 further includes a rotational disc 124 with angle restrictors 126 thereon. The rotational disc 124 effectively increases a contact area and a length of a supporting moment arm therebetween to stabilize further the rotational portion 120 rotating on the pedestal 130. Additionally, a lubricant, e.g. grease, can be added between the rotational disc 124 and the pedestal 130 to form a first sliding surface therebetween so as to further enhance a slippage performance thereof. The angle restrictors 126 couple to corresponding angle-restricting trenches 136 of the pedestal 130 to limit a rotational angle of the rotational portion 120 so as to limit the rotational angle of the flat display panel and prevent an unexpected rotation.

A rotational shaft washer 150 is disposed at one end of the rotational shaft 122, and a rotational disc is disposed at another end of the rotational shaft 122. The rotational shaft 122 further includes washer fixing devices 128 to couple to washer fixing holes 158 of the rotational shaft washer 150. The washer fixing devices 128, e.g. protrusions, couple to the washer fixing holes 158 to fix the rotational shaft washer 150 on the rotational shaft 122 so as to prevent the fixing device 160 from becoming loose when the rotational portion 120 is rotated. The fixing device 160 couples the rotational portion 120 to the pedestal 130 to provide a fixing force for avoiding a separation of the rotating portion 120 and the pedestal 130 when the rotational portion 120 is rotated on the pedestal 130. When the fixing device 160 is fixed in a corresponding fixing hole 146 of the rotational shaft 122, the pedestal 130 is effectively clamped by the fixing device 160 and the rotational portion 120. The fixing device 160 is a bolt or any other kind of fixing device. The fixing hole 146 is a screw hole or any other kind of corresponding fixing holes.

When the display swivel is rotated, the flat panel display may fall off if the fixing device 160 is loose. After the washer fixing holes 158 of the rotational shaft washer 150 are coupled to the washer fixing devices 128 of the rotational shaft 122, the rotational shaft washer 150, the rotational shaft 122, and the fixing device 160 can synchronally rotate to avoid relative motion between the fixing device 160 and the rotational shaft 122. Therefore, the display swivel 100 can be operated more safely and reliably because the fixing device 160 is prevented from becoming loose.

Between the rotational shaft washer 150 and the rotational ring 132, the display swivel 100 further utilizes a lubricating washer 140 to increase a rotation performance of the rotational portion 120. The lubricating washer 140 further includes a plurality of holes 144 or hollows to store lubricant therein. The lubricating washer 140 and the rotational shaft washer 150 form a second sliding surface therebetween to reduce a friction thereof for smoothly rotating the rotational portion 120. The first sliding surface can also include a plurality of holes or hollows to store the lubricant therein to reduce the friction force between the rotational portion 120 and the pedestal 130 for smoothly rotating the rotational portion 120.

The display swivel according to the present application utilizes the first sliding surface and the second sliding surface and configures the rotational ring 132 therebetween so as to reduce the friction and enhance the safety perfor-mance when the display swivel is rotated. The lubricating washer 140 further includes holes 144 to couple to lubricating washer fixing devices 134 of the rotational ring 132 to fix the lubricating washer 140 on the rotational ring 132. The lubricating washer fixing device 134 can be a protrusion inserting into the hole 144 or hollows for fixing the lubricating washer 140 on the rotational ring 132. The lubricating washer 140 further includes fixing corners 142 on two ends of the lubricating washer 140 to couple to corresponding fixing planes 138 of the rotational ring 132 so that the lubricating washer 140 can be effectively fixed on the rotational ring 132.

The present invention utilizes the rotational shaft washer to protect the fixing device on the rotational portion from the relative motion so as to enhance the safety performance and reliability of the display swivel. The present invention further utilizes the fixed lubricating washer so as to rotate the display swivel smoothly. The two sliding surfaces can further allow rotating the rotational portion more smoothly. Therefore, the display swivel according to the present invention can enhance the safety performance of the flat panel display under a convenient operation for users.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A display swivel, comprising:
   a rotational portion including a protruding rotational shaft;
   a pedestal coupled to the rotational portion, the pedestal including a rotational ring, the rotational shaft of the rotational portion being rotatably coupled to the rotational ring;
   a rotational shaft washer fixed on one end of the rotational shaft, the rotational shaft washer including a washer fixing hole;
   a lubricating washer coupled to the rotational ring and disposed between the rotational shaft washer and the rotational ring; and
   a fixing device passing through the rotational shaft washer and the lubricating washer so as to be coupled to the rotational shaft,
   wherein the rotational shaft includes a washer fixing device to be coupled to the washer fixing hole of the rotational shaft washer so as to fix the rotational shaft washer on the rotational shaft.

2. The display swivel of claim 1, wherein the rotational portion further comprises:
   a rotational disc configured on another end of the rotational shaft, the rotational disc and the pedestal forming a first sliding surface therebetween, and the rotational shaft washer and the lubricating washer forming a second sliding surface therebetween, wherein the first sliding surface and the second sliding surface are respectively disposed on both sides of the rotational ring to reduce friction for rotating the rotational portion.

3. The display swivel of claim 2, wherein the first sliding surface and the second sliding surface further comprise lubricant thereon.

4. The display swivel of claim 3, wherein the first sliding surface further comprises a plurality hollows to store the lubricant.

5. The display swivel of claim 3, wherein the lubricating washer further comprises a plurality of holes to store the lubricant.

6. The display swivel of claim 5, wherein the rotational ring further comprises a lubricating washer fixing device to be inserted into one of the holes of the lubricating washer to fix the lubricating washer on the rotational ring.

7. The display swivel of claim 2, wherein the rotational disc further comprises an angle restrictor, and the pedestal further comprises an angle-restricting trench corresponding to the angle restrictor to limit a rotational angle of the rotational portion.

8. The display swivel of claim 1, wherein the rotational ring further comprises two fixing planes to be coupled to two fixing corners of the lubricating washer so as to fix the lubricating washer on the rotational ring.

9. The display swivel of claim 1, wherein the fixing device comprises a bolt.

10. A flat panel display, comprising:
a display panel; and
a display swivel coupled to the display panel for adjusting a display angle of the display panel, the display swivel further comprising:
a rotational portion coupled to the display panel and including a protruding rotational shaft;
a pedestal coupled to the rotational portion and including a rotational ring, the rotational shaft of the rotational portion being rotatably coupled to the rotational ring;
a rotational shaft washer fixed on one end of the rotational shaft;
a lubricating washer coupled to the rotational ring and disposed between the rotational shaft washer and the rotational ring; and
a fixing device passing through the rotational shaft washer and the lubricating washer so as to be fixed on the rotational shaft, wherein:
the rotational portion further includes a rotational disc configured on another end of the rotational shaft;
the rotational disc and the pedestal form a first sliding surface therebetween;
the rotational shaft washer and the lubricating washer form a second sliding surface therebetween; and
the first sliding surface and the second sliding surface are respectively disposed on both sides of the rotational ring to reduce a friction for rotating the display panel.

11. The flat panel display of claim 10, wherein the rotational ring further comprises a lubricating washer fixing device coupled to a corresponding fixing hole of the lubricating washer to fix the lubricating washer on the rotational ring.

12. The flat panel display of claim 10, wherein the rotational disc further comprises an angle restrictor, and the pedestal further comprises an angle-restricting trench corresponding to the angle restrictor to limit a rotational angle of the rotational portion.

13. The flat panel display of claim 10, wherein the rotational ring further comprises two fixing planes to be coupled to two fixing corners of the lubricating washer so as to fix the lubricating washer on the rotational ring.

14. The flat panel display of claim 10, wherein the rotational shaft further comprises a washer fixing device to be coupled to a washer fixing hole of the rotational shaft washer to fix the rotational shaft washer on the rotational shaft.

15. The flat panel display of claim 10, wherein the fixing device comprises a bolt.

16. A display swivel, comprising:
a rotational portion, the rotational portion further comprising a rotational disc and a rotational shaft protruding from the rotational disc, the rotational disc further comprising an angle restrictor;
a pedestal coupling to the rotational portion, the pedestal further comprising a rotational ring and an angle-restricting trench, wherein the rotational shaft of the rotational portion rotatably couples to the rotational ring and the angle restrictor couples to the angle-restricting trench to limit a rotational angle of the rotational portion, and wherein the rotational disc and the pedestal form a first sliding surface therebetween;
a rotational shaft washer fixed on the rotational shaft;
a lubricating washer coupling to the rotational ring and disposed between the rotational shaft washer and the rotational ring, wherein the rotational shaft washer and the lubricating washer forming a second sliding surface therebetween, and the first sliding surface and the second sliding surface, both having a plurality of hollows for storing lubricant therein, are respectively disposed on both sides of the rotational ring to reduce friction for rotating the rotational portion; and
a fixing device passing through the rotational shaft washer and the lubricating washer to couple to the rotational shaft.

17. The display swivel of claim 16, wherein the rotational ring further comprises two fixing planes to couple to two fixing corners of the lubricating washer so as to fix the lubricating washer on the rotational ring.

18. The display swivel of claim 16, wherein the rotational shaft further comprises a washer fixing device to couple to a washer fixing hole of the rotational shaft washer to fix the rotational shaft washer on the rotational shaft, and the fixing device comprises a bolt.

* * * * *

UNITED STATES PATENT AND TRADEMARK OFFICE
CERTIFICATE OF CORRECTION

| | |
|---|---|
| PATENT NO. | : 7,226,028 B2 |
| APPLICATION NO. | : 11/153466 |
| DATED | : June 5, 2007 |
| INVENTOR(S) | : Chih-Chiang Lin |

It is certified that error appears in the above-identified patent and that said Letters Patent is hereby corrected as shown below:

Title Page:

Item (73) Assignee should read:

Quanta Computer Inc., Tao Yuan Shien (TW)

Signed and Sealed this

Eighteenth Day of September, 2007

JON W. DUDAS
*Director of the United States Patent and Trademark Office*